May 20, 1952 E. F. MacNICHOL, JR 2,597,352

DECODING DEVICE

Filed Oct. 10, 1944

INVENTOR.
EDWARD F. MacNICHOL JR.

BY William D. Hall

ATTORNEY

Patented May 20, 1952 2,597,352

UNITED STATES PATENT OFFICE 2,597,352

DECODING DEVICE

Edward F. MacNichol, Jr., Wenham, Mass., assignor, by mesne assignments, to the United States of America as represented by the Secretary of War Application October 10, 1944, Serial No. 558,050

7 Claims. (Cl. 250—27)

The present invention pertains to video pulse communication systems and more particularly to a method of, and means for, decoding video pulses appearing in pairs, the repetition time interval between pairs being fixed but the interval between pulses within the pair being variable.

It is an object of the present invention to provide a circuit which discriminates between radio frequency pulse pairs of variable separation.

It is another object of the present invention to provide a decoding circuit for video pulses appearing in pairs which yields an audible signal, or silence, depending upon the spacing between the pulses within the incoming pair.

It is another object of the present invention to provide circuits of the above types which are of simple design and construction.

Briefly stated, the objects of the present invention are attained in a preferred embodiment by using the first pulse of the incoming pair to shock excite a tank circuit into oscillation and superimposing the second pulse upon a voltage wave established by this oscillation. In association with the tank circuit, an amplitude discriminating circuit is provided to produce an output pulse when the second incoming pulse appears at the instant of maximum positive peak in the voltage wave generated by the tank. Accordingly, unless the second incoming pulse is spaced a specific interval from the first pulse as determined by the period of the oscillatory wave, no output will be obtained from the discriminator circuit. The discriminator output pulse, in turn, serves to key an audio frequency generator so that an audio signal is heard when the incoming pulse pair is correctly spaced.

For a better understanding of the invention, together with other and further objects thereof, reference is had to the following description taken in connection with the accompanying drawing. The scope of the present invention will be pointed out in the accompanying claims.

Figure 1:
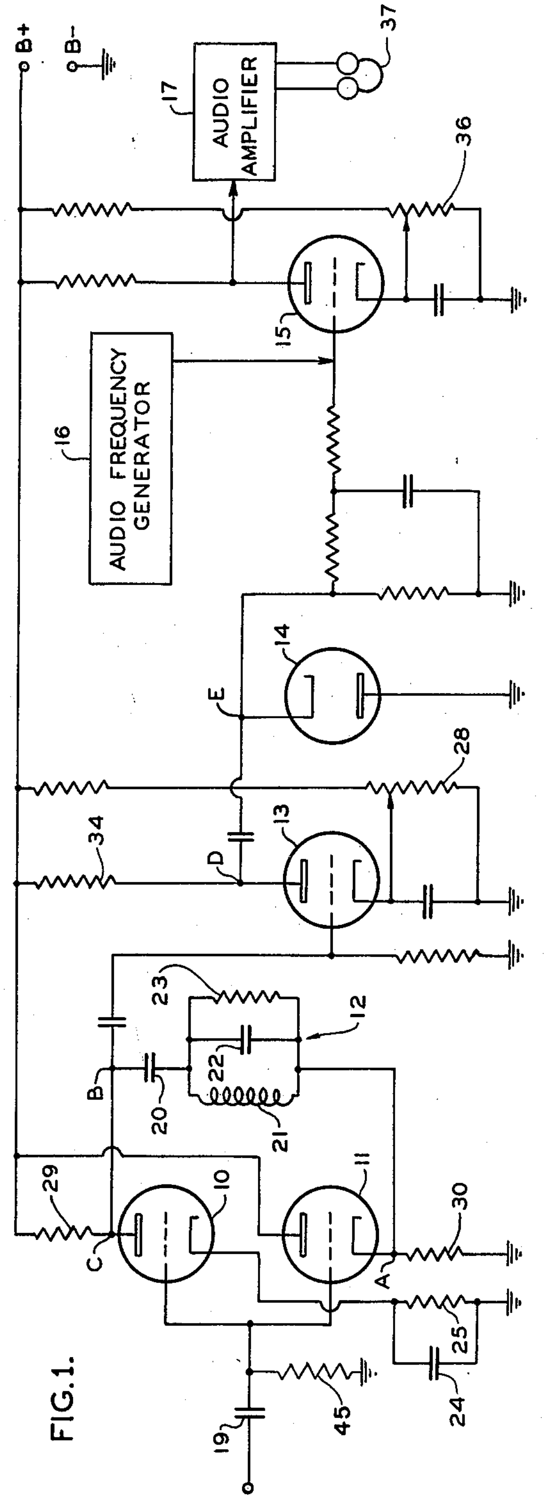
Figure 2:
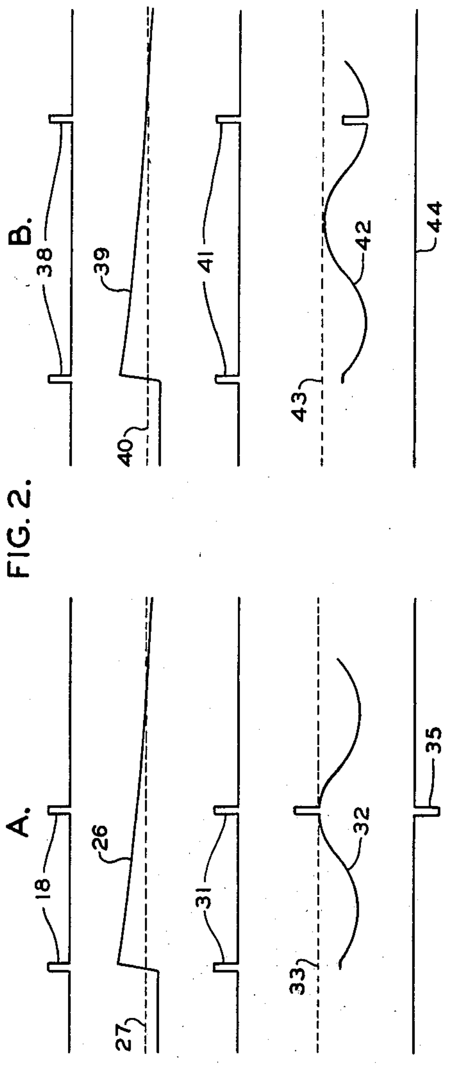

In the accompanying drawing:

Figure 1 is a schematic circuit diagram of a preferred embodiment of the invention for decoding video pulse, and, Figure 2 illustrates various wave forms developed in the circuit disclosed in Figure 1 when (A) the incoming pulse separation is set for an audible note, and (B) when the pulse separation is set for silence.

Referring now to Figure 1 the decoding device comprises an input circuit including triodes 10 and 11 and a parallel resonant tank 12, a discriminator circuit including triode 13 and diode 14, an electronic keying circuit including triode 15, a conventional audio frequency generator 16 and a conventional audio amplifier 17.

The circuit will first be treated as it functions with an incoming pulse pair whose separation is set for an audible note and the voltage wave forms developed at various points in the circuit disclosed in Figure 1 will be illustrated in Figure 2A wherein pulse pair 18 represents the incoming signal. It will be assumed for purposes of illustration that the separation between pulses of pair 18 is 7.5 microseconds. The incoming pulse air is impressed through the coupling circuit comprising capacitor 19 and resistor 45 on the grids of both triodes 10 and 11. Connected between the plate of triode 10 and the cathode of triode 11 through a coupling capacitor 20 is the tank circuit 12 consisting of an inductor 21 shunted by a capacitor 22 and a resistor 23. When the first incoming pulse of pair 18 is supplied to the grids of triodes 10 and 11, the tank 12 is shocked into oscillation. Connected between cathode of triode 10 and ground is a capacitor 24 shunted by a resistor 25, the combination having a long time constant. Immediately following the application of the first pulse, capacitor 24 will discharge through cathode resistor 25 thereby cutting off triode 10, and it is still in this condition when the second pulse appears. This is illustrated in Figure 2A wherein the exponential curve 26 represents the discharge of condenser 24 through resistor 25, while dash line 27 designates the bias point of cutoff in triode 10.

The plate of triode 10 is capacitatively coupled to the grid of triode 13 which is biased by means of a potentiometer 28 to a point beyond cutoff. No signal reaches the grid of triode 13 at the appearance of the first pulse as may be seen in a general way from the fact that the tendency of point A to rise in potential, and therefore drive point B upward, is cancelled by the tendency of point C (which is the same as point B) to fall inasmuch as the plate resistor 29 of triode 10 is equal to the ohmic value of the cathode resistor 30 of triode 11, the respective voltage drops developed thereacross being substantially of equal magnitude but of opposite polarity. The voltage wave generated by the tank 12 is by itself insufficient at any point in the cycle to overcome the bias imposed on triode 13.

Following the first pulse, the tank 12 continues to oscillate. Its period in the present example may be considered to be 10 microseconds. The potential at point B is then varying sinusoidally with this period. At the time the second pulse appears, triode 10 is still disabled because of the long time constant in its cathode circuit, hence the varying potential at point B will be the sum of subsequent pulses developed across resistor 30 superimposed on the oscillatory wave of the tank 12. The voltage at point A of triode 11 is represented by form 31 in Figure 2A, and it will be seen that a pulse is produced at point A simultaneous with the appearance of each incoming pulse in pair 18.

The underlying principle of the present invention is that if the second pulse of pair 18 appears at the time when point B is at a negative peak, the net signal reaching the grid of triode 13 will be considerably smaller than in the case when a second pulse appears at a time when point B is at a positive peak from the oscillation of tank 12. The latter condition is illustrated in Figure 2A where wave form 32 represents the output of tank 12 combined with pulse 31, and dash line 33 represents the clipping level of triode 13 as set by potentiometer 28. It will be evident that since the period of the wave produced by tank 12 is 10 microseconds, and the second pulse is spaced 7.5 microseconds from the first in pair 18, the second pulse combines with the oscillatory wave at the positive peak thereof.

The remainder of the circuit is so designed as to discriminate against all signals from point B except those with amplitudes corresponding to a pulse superimposed over a positive oscillation peak, that is, no audible signal will be obtained from audio generator 16 except under this optimum condition. Triode 13 functions as an amplifier and inverter. When the second pulse of pair 18 is so positioned in respect to the wave generated by tank 12 that it adds to the positive peak thereof, the net voltage for the duration of the second pulse is of sufficient magnitude to overcome the bias on triode 13 rendering it conductive with a resultant voltage drop across plate resistor 34 causing a negative-going pulse to appear at point D. This condition is illustrated in Figure 2A by form 32 where it will be seen that at the position corresponding with the second pulse, the voltage exceeds the clipping level of triode 13 as represented by dash line 33.

The negative going pulse at point D is illustrated in Figure 2A by pulse 35 which corresponds in position with the second pulse of pair 18. When the potential at point D is varied as a result of a series of properly spaced pulse pairs, the potential at point E will rise above ground because of the action of diode 14 which is conductive for the duration of the negative pulse 35. This raises the voltage on the grid of triode 15 relative to its cathode rendering said tube conductive.

Triode 15 is initially biased beyond cutoff by a voltage obtained from potentiometer 36. The output wave of audio generator 16 is directly fed to the grid of triode 15 but is of insufficient magnitude to overcome the bias imposed thereon. When the positive pulse from point E is applied to the grid of triode 15 the bias on the grid thereon is reduced to a point causing the tube to conduct in accordance with the output wave of audio generator 16. The audio frequency fluctuations in the plate circuit of triode 15 are applied to an audio frequency amplifier 17, the output thereof being connected to an audio reproducer 37 emitting an audible signal. Thus it has been shown in the present example that when the incoming pulse spacing of pair 18 is 7.5 microseconds, an audible tone is produced by the circuit.

The circuit will now be treated with a pulse pair whose separation is set for silence as shown in Figure 2B wherein pulse pair 38 is spaced 12.5 microseconds apart. With the appearance of the first pulse of pair 38 on the grids of triodes 10 and 11, a bias is imposed on triode 10 by cathode condenser 24 for a period determined by shunt resistor 25 as shown by the exponential discharge wave 39. Dash line 40 indicates the cutoff level of triode 10 and it will be seen that said triode remains disabled with the appearance of the second pulse. The voltage at point A of triode 11 is shown by form 41 in Figure 2B, and it will be noted that a pulse appears simultaneous with the appearance of the incoming pulses 37. The combination of pulse 41 with the output wave of tank 12 is shown by wave form 42, dash line 43 representing the clipping level of triode 13. Since the period of the oscillatory wave is 10 microseconds, the second pulse combines with the wave output of tank 12 at a negative peak, hence the combined voltage at this point falls below the clipping level of triode 13 thereby effecting no change in the output thereof as shown by straight line 44. Thus it has been shown that with pulse pair 38 being spaced 12.5 microseconds apart, no audible signal is heard in reproducer 37.

It is then obvious that communication may be established between a transmitter emitting video pulse signals in pairs, the repetition time being fixed but the interval between pulses within the pair being variable, and a receiving station incorporating a decoding circuit of the type disclosed herein.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. The method of decoding pulses appearing in pairs, the repetition time interval between pairs being fixed, but the interval between pulses within the pair being variable, comprising the steps of first generating at least a complete cycle of sinusoidal voltage upon the advent of the first pulse of each pair and simultaneously preventing said first pulse from being superimposed upon said sinusoidal voltage, superimposing the second pulse of each pair upon said sinusoidal voltage and producing an indication when the second pulse is so spaced from the first pulse as to be superimposed over the positive peak of the sinusoidal voltage.

2. The combination in a device for decoding pulse pairs applied thereto, comprising a tank circuit, means for shock exciting said tank circuit to produce an oscillatory voltage upon the application of the first pulse of each pair, means for preventing said first pulse from being superimposed upon said oscillatory voltage, means for superimposing the second pulse of each pair upon said oscillatory voltage, and means to indicate when said second pulse and said oscillatory voltage are in predetermined phase relation.

3. The combination in a device for decoding pulse pairs applied thereto, comprising a tank circuit, means for shock exciting said tank circuit to produce an oscillatory voltage upon the application of the first pulse of each pair, means for preventing said first pulse from being superimposed upon said oscillatory voltage, means for superimposing the second pulse of each pair upon said oscillatory voltage, and means to indicate when said second pulse is superimposed upon a positive peak of said oscillatory voltage.

4. The combination in a device for decoding pulse pairs applied thereto, comprising a tank circuit, means for shock exciting said tank circuit to produce an oscillatory voltage upon the application of the first pulse of each pair, means for preventing said first pulse from being superimposed upon said oscillatory voltage, means for superimposing the second pulse of each pair upon said oscillatory voltage, and an amplitude discriminating means responsive only to voltages of a magnitude corresponding to said second pulse superimposed upon a positive peak of said oscillatory voltage.

5. The combination in an apparatus for generating an oscillatory wave in response to a first pulse of a pulse pair applied to said apparatus, and for combining said wave with the second pulse of said pulse pair, comprising a pair of triodes having a common input circuit and having independent output circuits to produce phase-opposing voltages, a tank circuit disposed between said output circuits to produce an oscillatory wave when shock excited, means for applying said first pulse to said common input circuit to shock excite said tank circuit, means for cutoff biasing the first of said pair of triodes subsequent to application of said first pulse for a period extending beyond the application of said second pulse, thereby rendering said first triode unresponsive to said second pulse, the second of said pair of triodes being responsive to said second pulse, and means including said tank circuit for superimposing the output signal of said second triode upon the oscillatory wave generated by said tank circuit.

6. A device for decoding pulses occurring in pairs comprising a pair of vacuum tubes simultaneously responsive to the first of said pulses and having a common input circuit to which said pulses are sequentially applied, said tubes having independent output circuits to produce equal phase-opposing voltage signals upon advent of said first pulse, a tank circuit disposed between said output circuits to produce an oscillatory voltage when shock excited by the application of said first pulse, means for producing a blocking potential subsequent to application of said first pulse to cut off the first of said pair of vacuum tubes for a period extending beyond the advent of said second pulse, whereby said first vacuum tube is rendered unresponsive to said second pulse, the second of said pair of vacuum tubes being responsive to said second pulse means including said tank circuit for superimposing the output voltage from said second tube upon said oscillatory voltage, an amplitude discriminating circuit connected to the output of said tank circuit and responsive only to voltages of a magnitude corresponding to said second pulse superimposed upon a positive peak of said oscillatory voltage, and means coupled to said discriminating circuit for indicating the response thereof to said superimposed voltage.

7. A device for decoding pulses occurring in pairs comprising a pair of vacuum tubes simultaneously responsive to the first of said pulse pair and having a common input circuit to which said pulses are sequentially applied, said tubes having independent output circuits adapted to produce equal phase-opposing voltage signals upon application of said first pulse, a tank circuit disposed between said output circuits to produce an oscillatory voltage when shock excited by said first pulse, means for producing a blocking potential subsequent to application of said first pulse to cutoff only the first of said pair of vacuum tubes for a period extending beyond the advent of the second of said pulse pair, whereby the second of said pair of vacuum tubes is responsive to said second pulse and the corresponding output voltage from said second tube is superimposed upon said oscillatory voltage, a discriminator tube having its input circuit coupled to said tank circuit and biased so that it is responsive only to voltages of a magnitude corresponding to said second pulse superimposed upon the positive peak of said oscillatory voltage, an audio frequency amplifier having its input circuit coupled to the output circuit of said discriminator tube, an audio frequency generator having its output coupled to the input circuit of said amplifier, and means for biasing said amplifier whereby said amplifier is only responsive to said audio output when said second pulse is superimposed upon said positive peak of said oscillatory voltage.

EDWARD F. MACNICHOL, JR.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,181,309 | Andrieu | Nov. 28, 1939 |
| 2,212,420 | Harnett | Aug. 20, 1940 |
| 2,212,648 | Poch | Aug. 27, 1940 |
| 2,277,000 | Bingley | Mar. 17, 1942 |
| 2,440,278 | Labin et al. | Apr. 27, 1948 |
| 2,468,058 | Grieg | Apr. 26, 1949 |